May 1, 1923.

Re. 15,594

T. B. POWERS

SIGNAL FOR VEHICLES

Original Filed Aug. 11, 1919 2 Sheets-Sheet 1

INVENTOR
Timothy B. Powers
BY
Dunn, Goodlett, Massie & Scott
ATTORNEYS

May 1, 1923.

Re. 15,594

T. B. POWERS

SIGNAL FOR VEHICLES

Original Filed Aug. 11, 1919 2 Sheets-Sheet 2

INVENTOR
Timothy B. Powers
BY
Dunn, Goodlett, Massie & Scott.
ATTORNEYS

Reissued May 1, 1923. Re. 15,594

UNITED STATES PATENT OFFICE.

TIMOTHY B. POWERS, OF BROOKLYN, NEW YORK, ASSIGNOR, BY MESNE ASSIGNMENTS, TO TURN-O-STOP MANUFACTURING CORPORATION, INC., OF NEW YORK, N. Y., A CORPORATION OF NEW YORK.

SIGNAL FOR VEHICLES.

Original No. 1,334,047, dated March 16, 1920, Serial No. 316,604, filed August 11, 1919. Application for reissue filed May 28, 1921. Serial No. 473,385.

*To all whom it may concern:*

Be it known that I, TIMOTHY B. POWERS, a citizen of the United States, residing at Brooklyn, in the county of Kings and State of New York, have invented certain new and useful Improvements in Signals for Vehicles, of which the following is a specification.

This invention relates to signaling devices, and more particularly to such devices as are suitable for use in indicating the intention of a vehicle driver to change the progress of his vehicle, as by turning to the right or left, or altering its speed as by slowing down or stopping. The devices of the invention are primarily intended to be mounted at the rear of a vehicle to attract the attention of those following, but may also be mounted to indicate to one in front of the vehicle, such as a traffic officer, the driver's intent.

The principal object of the invention is to provide a signaling device which will be effective both by day and by night to visually attract attention and indicate the impending course of a vehicle, which device may comprise a casing, two or more plates hingedly carried by the casing and normally folded or closed to form a dihedral angle to close the open side of the casing and to conceal a light supported adjacent the casing, together with means for unfolding or swinging the plates to open or signaling position whereby the light is exposed and the plates illuminated thereby.

Another object of the invention is to provide, in such a signaling apparatus, a catch mechanism to normally hold the plates in closed position secure against accidental opening and against tampering, and means for releasing the catch mechanism to allow the plates to be unfolded to expose the open side of the casing, also means for limiting such unfolding movement of the plates.

A further object of this invention is to provide in connection with a pair of signal devices, located on opposite sides of a vehicle, controlling means whereby the operation of a single member will serve to actuate either one of the signals, at the will of the driver, or by a different movement will serve to cause both signals to operate simultaneously, for the purpose of indicating that the vehicle will reduce its speed or stop, and also to illuminate the road at the rear, when backing.

Still another object of the invention is to provide in connection with a visual signal of the type referred to an audible signal, and means for operating the audible signal when the visual signal is operated.

In the accompanying drawings illustrating one embodiment of my invention, Figure 1 shows in outline the rear of a motor vehicle, with a signal device on each side.

Figure 1:
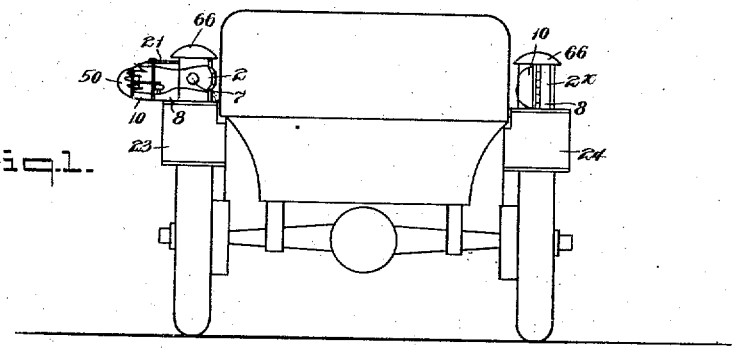

Each of the signal devices, which are substantially identical, comprises stationary weather resisting or exterior enclosing elements including a casing or frame denoted generally by 2, a circular base 3, and a circular cover plate 66 which may be mounted on a semi-circular top plate 4 secured to the casing 2; the members 3 and 4 constituting end walls in contradistinction to the member 2 which constitutes a side wall.

A brace plate 5 is secured at the intermediate part of the casing, and may be of suitable insulating material, such as wood or fiber, and serves to support a lamp base for carrying a small electric lamp 7 extending forward. This plate also serves to carry terminals for the electric members.

Figure 8:
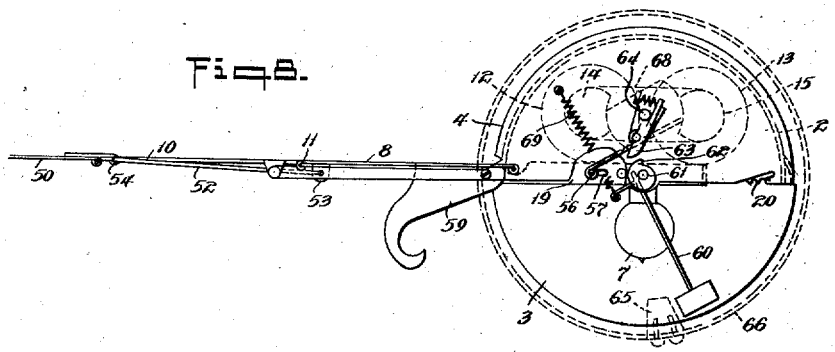
Fig. 8 is a plan view.
Figure 9:
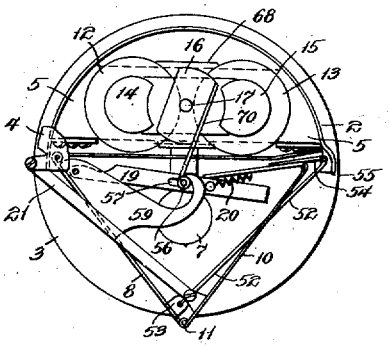
Fig. 9 is a plan view with the top plate broken off.

A jointed signal member is attached to the casing, shown in the form of a plate 8 hinged at 9 to one side of the casing 2. A second plate 10 is hinged at 11 to the outer free edge of the plate 8. These two plates are adapted to be swung from a position projecting outwardly in alinement and parallel with the two vertical edges of the casing 2 to a folded or angular position in which they form a dihedral angle within which the lamp is included, and practically close the exposed front of the casing as indicated in Fig. 9. The plates 8 and 10 thus constitute movable enclosing elements cooperating with the stationary enclosing elements above referred to, to complete the enclosure of the operating mechanism. When the plates are in closed position the lamp 7, which may be white or colored, is obscured by these two plates; but when the plates are swung outward to the position indicated in Fig. 8 at the left, not only will the light be exposed, but these plates will be illuminated by this light. It is to be understood that any suitable legend may be inscribed on these plates such as the words, "Look Out," or "Turn."

Figure 7:
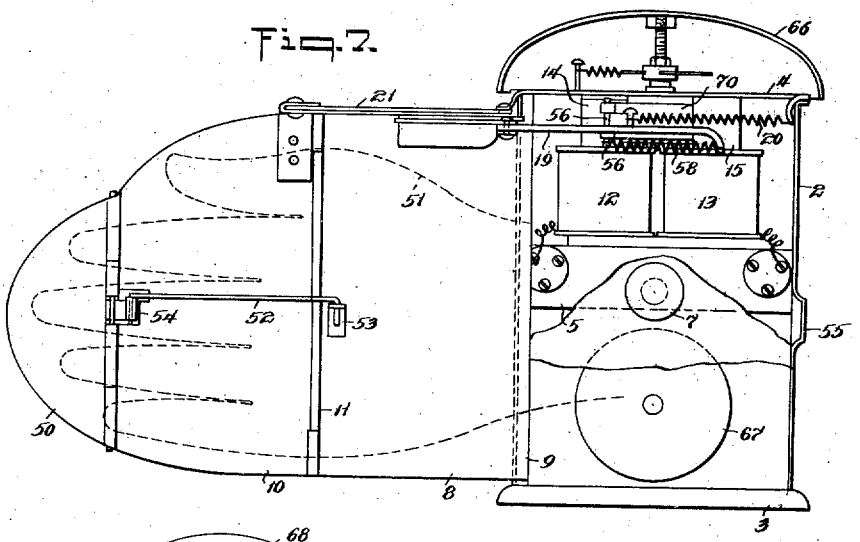
Fig. 7 is a front view of one signal device in the open position.

Suitable means are provided for quickly shifting the signal plates from the closed position to the open position. As shown I provide electro-magnetic means which may be actuated from the usual storage battery or other source of current on the vehicle. From the top plate 4, I suspend a pair of field magnets 12 and 13 having pole pieces 14, 15. An armature 16 swings on a pivot 17, on a brass plate 68 on the magnets. A link 19 connects the armature arm 70 with the swinging plate 8, which is so arranged that the armature is in a position transverse to the field when the plate 8 is in the closed position, and on energizing the magnets, the armature will be drawn to a position parallel with the field, which will swing the plate 8 to the open position projecting beyond the casing, as indicated in Fig. 7. Such swinging movement is limited by the abutment of the link 19 against the inner hinged edge of the plate 8, as shown in Fig. 8. A coil spring 20 connects the armature link and the casing, and serves to retract the armature when the magnets are deenergized, and also acts to swing the plate 8 back to the closed position.

The outer swinging plate 10 connects with the casing by a link 21, that will cause the plate 10 to project outwardly from the plate 8 in the open position, and when the plate 8 is swung in toward the casing, this link will swing the plate 10 on the plate 8, and cause it to assume an angular position relative to the plate 8 adjacent the casing, the plates 8 and 10 thus forming a dihedral angle to close the open front side of the casing.

I may also provide a third plate 50 hinged to the outer edge of the swinging plate 10 of much smaller size than the other plates. These plates may have the representation of a hand 51 painted thereon, as indicated in Fig. 7. A link 52 has one end pivoted at 53 to the plate 8, the other end of this link being pivoted to a lug 54 on the third plate 50. By this means when the plates 8 and 10 are swung inwardly by the armature, the plate 50 will also swing inwardly to the position indicated in Fig. 9, the link 52 causing this third plate to swing in and out, as shown. It will be observed from Fig. 9 that when the plates swing inwardly they will inclose the lamp 7, and will lie adjacent and be enclosed by the front margins of the top and bottom members 66 and 3 which keep out the weather, as shown. The casing 2 is given an extension 55 that will project a short distance beyond the hinge of the third plate, see Fig. 9. This would prevent persons from engaging the hinge portion and trying to pull the plates outward.

I further provide locking means to prevent the plates being opened from the closed position, except on operation of the armature by the magnets. The arm 70 on the armature is provided with a stud or latch member 56 that projects through a slot 57 in the link 19. A coil spring 58 connects this stud 56 with the extremity of the link 19, see Fig. 7, and serves to hold the stud at one end of the slot, as shown. A catch plate 59 is secured to the swinging plate 8, and in the closed position is engaged by the stud 56 as shown in Fig. 9. This will prevent the plate 8 from swinging outwardly, but when the armature first swings the stud 56 will shift in the slot in the link 19, against the force of the spring 58. This will release the catch 59, and when the stud reaches the other end of this slot, it will shift the link 19 to swing the plates to the open position. The catch will automatically reengage by its beveled end when the spring 20 returns the plates to the closed position.

It is customary in such devices to provide an audible signal. For this purpose I prefer to employ one of the exterior weather resisting and enclosing elements as a resonant member to be struck by a hammer or clapper for the production of such audible signal, thereby obviating the former practice of providing a separate bell element. As shown, a hammer 60 with spring 69 swings on a pivot 61 and a lug 62 is engaged by a spring pawl 63 mounted on the upper extension of the shaft 64 of the armature. As the armature is swung to open the plates, the spring pawl 63 will trip the hammer 60, that will strike a lug 65 on the resonant cover plate 66 on top of the casing 2. But if preferred an electric bell 67 may be arranged in the casing in circuit with the magnets 12 and 13 that will be operated when the magnets are energized.

Figure 2:
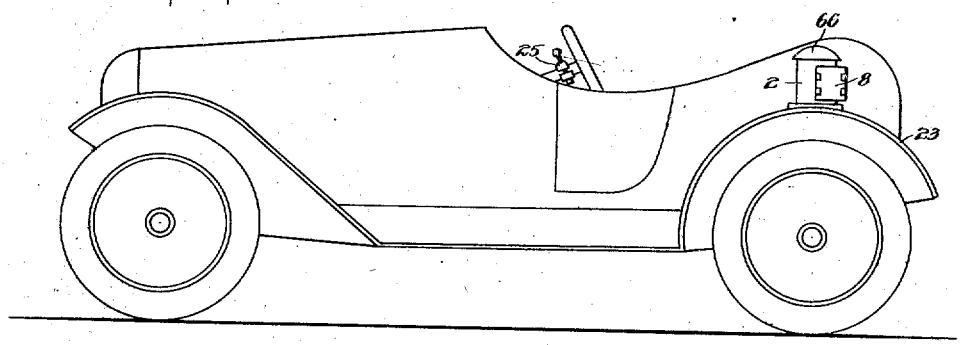
Fig. 2 is a side elevation indicating one signal device, and the control.
Figure 4:
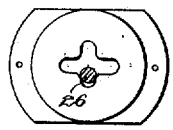
Figs. 4, 5 and 6 show the switch control.
Figure 5:
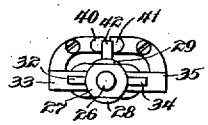
Figure 6:
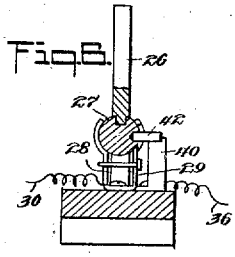
Figure 3:
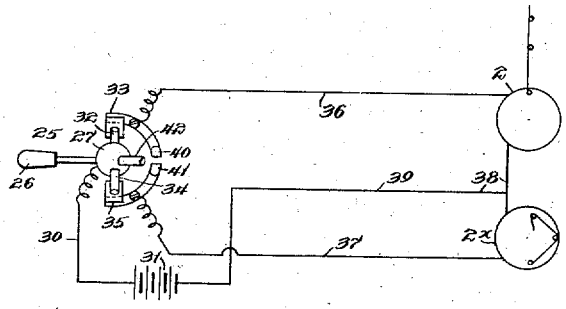
Fig. 3 is a diagram of the circuits from the switch to the two signal devices.

As shown in Figs. 1 and 2, I preferably locate one of these signal devices, as set forth, on each of the rear mud guards, 23, 24, and the jointed signal member is arranged to swing outwardly from the side of the vehicle, as indicated. But obviously these may be placed in any other position on the vehicle, and a pair could be placed at the front at each side to indicate to the traffic officer the direction in which the driver desired to turn.

I further provide a control device for operating either one, or both of the signal members, 2 or 2$^{x}$, shown in the form of a switch 25, comprising a lever or arm 26 extending from a ball 27. This ball is mounted in cup portions of arms 28 and 29 to have a universal movement therein; which arms connect with one wire 30 from a source of current or battery 31. The lever 26 carries a terminal pin 32 that when the lever is swung to one side, will engage a terminal plate 33. On the opposite side the switch lever carries a terminal pin 34, that when the lever is swung in this direction, will engage a terminal plate 35. These terminals 33 and 35 connect respectively with the signal members 2, and 2×, that is with their electro-magnets, by wires 36 and 37. Wires 38 and 39 lead from the two signal members back to the battery at 31.

A third terminal plate 40 is connected with the said terminal 33; and another terminal 41 is connected with the said terminal plate 35, and these two plates are arranged adjacent but out of contact. They are so positioned as to be engaged by a terminal pin 42 on the switch lever 26 when the lever is swung in a third direction. This will bridge these terminals 40 and 41, and therefore cause the electro-magnets in both of the signal devices 2 and 2× to be in circuit with the current supply at 31. Therefore both of the signal devices will operate, and the vehicles at the rear will understand that this vehicle intends to reduce speed, or stop.

It will be understood that each of the signal devices is provided with a light, and that this form of switch in one position will cause both lamps to be lighted. This serves a special purpose of illuminating the road at night when it is desired to back the vehicle, and the use of both lamps is very effective for this purpose.

What I claim is:—

1. In a signaling apparatus, a casing, a plate hinged to one side of the casing, an actuating member connected with the plate to cause it to swing out of the casing and to retract it, a plate hinged to the outer edge of said plate, a link pivoted between the second plate and the casing, whereby when the first plate is swung outward the second plate will swing outward to a position in alinement with the first plate, and when the first plate is swung back to the casing the second plate will be swung to a position adjacent the casing, and a lamp on the front of the casing normally surrounded and obscured by the two plates but exposed when the plates are swung outward into alinement.

2. In a signaling apparatus, a casing, a plate hinged to one side of the casing, an actuating member connected with the plate to cause it to swing out of the casing and to retract it, a plate hinged to the outer edge of said plate, a link pivoted between the second plate and the casing, whereby when the first plate is swung outward the second plate will swing outward to a position in alinement with the first plate, and when the first plate is swung back to the casing the second plate will be swung to a position adjacent the casing, and a lamp on the front of the casing normally surrounded and obscured by the two plates but exposed when the plates are swung outward into alinement in which exposed position the plates are illuminated by the lamp.

3. In a signaling apparatus, a casing, a plate hinged to one side of the casing, an actuating member connected with the plate to cause it to swing out of the casing and to retract it, a plate hinged to the outer edge of said plate, a link pivoted between the second plate and the casing, whereby when the first plate is swung outward the second plate will swing outward to a position in alinement with the first plate, and when the first plate is swung back to the casing the second plate will be swung to a position adjacent the casing.

4. In a signaling apparatus, a casing, a plate hinged to one side of the casing, a second plate hinged to the outer edge of said plate, an electro-magnet in the casing, an armature arranged to swing in the field of the magnet, a link connecting the armature with the first plate arranged to swing the plate outward, a spring arranged to retract the armature and said plates, and a link pivoted between the second plate and the casing whereby when the first plate is swung outward the second plate will swing outward to a position in alinement with the first plate and when the first plate is swung back to the casing the second plate will be swung to a position adjacent the casing.

5. In a signaling apparatus, a casing, a plate hinged to one side of the casing, an actuating member connected with the plate to shift it to project out from the casing and to retract it, a second plate hinged to the outer edge of said plate, a link pivoted between the second plate and the casing, whereby when the first plate is swung outward the second plate will be swung outward to a position in alinement with the first plate, and when the first plate is swung back to the casing the second plate will be swung to a position adjacent the casing, and a catch to lock the plates at the casing that is released by the actuating means.

6. In a signaling apparatus, a casing, a lamp projecting from the casing, a plate hinged to one side of the casing to swing out from the casing whereby said plate can project outwardly and can fold inwardly to conceal said lamp, an electro-magnet in the casing, an armature for said magnet, an arm fast on said armature, a pin on said arm, a link pivoted to said plate and having a slot at which portion it engages said pin, whereby when the armature moves it will first have the pin travel free in the link slot and thereupon will shift the link to swing the said plate, and a catch on said plate engaging said pin until the arm moves the pin in said link slot to normally lock the plate in closed position.

7. In a signaling apparatus, a casing, a plate hinged to one side of the casing, a second plate hinged to the outer portion of said plate, an electro-magnet in the casing, an armature arranged to swing in the field of the magnet, a link connecting the armature with the first plate arranged to swing the plates outward, a spring arranged to retract the armature and said plates, a link pivoted between the second plate and the casing whereby when the first plate is swung outward the second plate will swing outward to a position in alinement with the first plate and when the first plate is swung back to the casing the second plate will be swung to a position adjacent the casing, a bell, and a hammer engaged by the armature to be tripped when the plates are swung thereby.

8. In a signaling device, a casing, a plate hinged to one side of the casing, a second plate hinged to the outer edge of said plate, a third plate hinged to the outer edge of the second plate, actuating means connected with the first plate to swing it toward and from the casing, a link pivoted between the second plate and the casing, and a link pivoted between the third plate and the first plate, whereby when the first plate is swung outward the other two plates will be swung outward into alinement therewith, and when the first plate is swung in toward the casing the said other two plates will swing inward adjacent the casing.

9. In a signaling device, a casing, a plate hinged to one side of the casing, a second plate hinged to the outer edge of said plate, a third plate hinged to the outer edge of the second plate, a lamp on the casing, actuating means connected with the first plate to swing it toward and from the casing, a link pivoted between the second plate and the casing, and a link pivoted between the third plate and the first plate, whereby when the first plate is swung outward the other two plates will be swung outward into alinement therewith, and when the first plate is swung in toward the casing the said other two plates will swing inward and serve to surround and conceal the lamp.

10. In a signaling device, a casing, a plate hinged to one side of the casing, a second plate hinged to the outer edge of said plate, a third plate hinged to the outer edge of the second plate, an electro-magnet connected with the first plate to swing it out from the casing, a spring arranged to swing the plate in adjacent the casing, a link pivoted between the second plate and the casing, and a link pivoted between the third plate and the first plate, whereby when the first plate is swung outward the other two plates will be swung outward into alinement therewith, and when the first plate is swung in toward the casing by the spring the said other two plates will swing inward adjacent the casing.

11. In a signaling device, a casing, a plate hinged to one side of the casing, a second plate hinged to the outer edge of said plate, a third plate hinged to the outer edge of the second plate, a lamp on the casing, an electro-magnet connected with the first plate to swing it out from the casing, a spring arranged to swing the plate in adjacent the casing, a link pivoted between the second plate and the casing, and a link pivoted between the third plate and the first plate, whereby when the first plate is swung outward the other two plates will be swung outward into alinement therewith, and when the first plate is swung in toward the casing by the spring the said other two plates will swing inward and serve to surround and conceal the lamp.

12. In a signal device, a casing provided with a cover plate and a bottom plate that both extend forwardly beyond said casing, a lamp projecting from the casing, a plate hinged to one side of the casing, a plate hinged to the outer edge of said plate, and mechanism connected to the plates whereby they may swing outwardly into alinement and swing inwardly to a position angular to said casing around said lamp, in which latter position said cover and bottom plate extensions project beyond and protect the top and bottom edges of said two swinging plates and inclose the lamp.

13. In a signal device, a casing provided with a cover plate and a bottom plate that both extend forwardly beyond said casing, a lamp projecting from the casing, a plate hinged to one side of the casing, a plate hinged to the outer edge of said plate, and mechanism connected to the plates whereby they may swing outwardly into alinement and swing inwardly to a position angular to said casing to conceal said lamp, in which latter position said cover and bottom plate extensions project beyond and protect the top and bottom edges of said two swinging plates and inclose the lamp, the free edge of said outer swinging plate in the folded position being located inside of one edge of the casing.

14. In a signal apparatus, a casing, a signal plate pivotally mounted along one edge of the casing, an actuating mechanism within the casing including a link connected with the plate, said link abutting the pivotal mounting of the signal plate to limit the opening movement of the signal plate.

15. In a signal apparatus, a casing, a signal plate pivotally mounted adjacent one edge of the casing, an electro-magnet within the casing, an armature for the electro-magnet, and a link connected at one end with the armature and at the other end with the plate, said link abutting the pivotal mounting of the signal plate to limit the opening movement of the signal plate and being held against the same when the magnet is energized.

16. In a signal apparatus, a casing, a signal plate pivotally mounted adjacent one edge of the casing, an electro-magnet within the casing, an armature for the electro-magnet, a link connected at one end with the armature through a lost-motion connection and at the other end with the plate, said link abutting the pivotal mounting of the signal plate to limit the opening movement of the signal plate and being held against the same when the magnet is energized, a spring to draw the signal plate to closed position, and a catch mechanism for holding the plate in closed position, the catch being released during the take-up of the lost-motion connection.

17. In a signal apparatus, a casing having a sheet-metal side wall provided with vertical edges and having sheet-metal end walls, a signal plate pivotally mounted at one edge alongside an edge of a side wall of the casing, a second plate pivotally mounted on the first plate at the opposite edge thereof, and means interconnecting the two plates and the casing whereby actuation of the first plate toward closed position brings the outer edge of the second plate to a position adjacent the other edge of the casing.

18. In a signal apparatus, a casing having sheet-metal side walls provided with vertical edges and having sheet-metal end walls, a signal plate pivotally mounted at one edge alongside an edge of a side wall of the casing, a second plate pivotally mounted on the first plate at the opposite edge thereof, and means interconnecting the two plates and the casing whereby actuation of the first plate toward closed position brings the outer edge of the second plate to a position adjacent the other edge of the casing, said means including an actuating mechanism within the casing, and a link connected to the actuating mechanism and to the first plate, said link abutting the pivotal mounting of the first plate when the first plate is in open position.

19. In a signal apparatus, a casing having sheet-metal side walls provided with vertical edges and having sheet-metal end walls, a signal plate pivotally mounted at one edge alongside an edge of a side wall of the casing, a second plate pivotally mounted on the first plate at the opposite edge thereof, and means interconnecting the two plates and the casing whereby actuation of the first plate toward closed position brings the outer edge of the second plate to a position adjacent the other edge of the casing, said means including an actuating mechanism within the casing, a link connected to the actuating mechanism and to the first plate, said link abutting the pivotal mounting of the first plate when the first plate is in open position, a projecting element on one of the end walls of the casing, and a link pivoted to this element and to the second plate.

20. In a signal apparatus, an open sided casing, a pair of plates hingedly associated with the casing and mounted to have an open position and a closed position in which they form a dihedral angle to close the open side of the casing, means for swinging the plates from closed to open position, and a catch mechanism comprising a member mounted on said swinging means and a cooperating member mounted for movement with one of said plates to lock the plates in closed position, said swinging means including mechanism for releasing the catch on the initial movement of the swinging means.

21. In a signal apparatus, an open sided casing, a pair of plates hingedly associated with the casing and mounted to have an open position and a closed position in which they form a dihedral angle to close the open side of the casing, means for swinging the plates from closed to open position, a latch-member carried by said means, and a catch mounted on one of said plates and engageable with said latch-member to lock said plates when in closed position, said swinging means including mechanism for releasing the catch on the initial movement of the swinging means.

22. In a signal apparatus, a casing, a pair of plates hingedly associated with the casing and mounted to have an open position and a closed position in which they form a dihedral angle to close the open side of the casing, means for swinging the plates from closed to open position, a latch-member carried by said means, and a catch mounted on one of said plates and engageable with said latch-member to lock said plates when in closed position, said swinging means including a lost-motion device whereby the catch is disengaged from the latch-member during the initial movement of said swinging means.

23. In a signal apparatus, a casing, a pair of plates hingedly associated with the casing and mounted to have an open position and a closed position in which they form a dihedral angle to close the open side of the casing, link-mechanism for swinging the plates from closed to open position, an electro-magnet secured to the casing, an armature-lever for said magnet to actuate said link-mechanism, a latch-member carried by said armature-lever, and a catch mounted on one of said plates and engageable with said latch-member to lock said plates in closed position, said armature-lever being operated by said magnet to disengage said latch-member and catch to permit actuation of said link-mechanism when said magnet is energized.

24. In a vehicle signal, in combination, a lamp, a number of stationary exterior enclosing elements one of which is of resonant material, a number of cooperating movable visual signaling and enclosing elements, means whereby the latter mentioned elements are movably mounted relative to the casing to have signaling and enclosing positions, said stationary enclosing elements and said movable enclosing elements when in the enclosing position housing the lamp, a clapper to strike said resonant stationary enclosing element, and means located within the housing which said enclosing elements constitute for operating said clapper to produce an audible signal.

25. In a vehicle signal, in combination, a lamp, a number of enclosing elements one of which is of resonant material, a number of cooperating movable visual signaling elements, means whereby the latter mentioned elements are movably mounted relative to the casing to have signaling and enclosing positions, said stationary enclosing elements and said movable enclosing elements when in the enclosing position housing the lamp, a clapper to strike said resonant enclosing element, means located within the housing which said enclosing elements constitute for moving said visual signaling elements to signaling position, and means operated when said actuating means are operated for operating said clapper to produce an audible signal.

26. In a vehicle signal, in combination, a lamp, a number of enclosing elements one of which is of resonant material, a number of cooperating movable visual signaling elements, means whereby the latter mentioned elements are movably mounted relative to the casing to have signaling and enclosing positions, said stationary enclosing elements and said movable enclosing elements when in the enclosing position housing the lamp, a clapper to strike said resonant enclosing element to produce an audible signal, and electro-magnetic means located within the housing which said enclosing elements constitute for (simultaneously) moving said visual signaling elements to signaling position and actuating said clapper.

27. In a signal apparatus, a casing having a semi-cylindrical side wall and circular end walls, the edges of the end walls fitting the respective ends of the side walls whereby semi-circular portions of the end walls project beyond the side walls, plates hingedly associated with the side wall, and means whereby said plates are positioned to constitute a closure for the casing when in one position, and when in another position a semaphore signal.

28. In a signal apparatus, a casing having side walls provided with an opening, a plate hingedly mounted adjacent one of the edges of the opening, and means to swing the plate into extended signaling position, said means comprising an electro-magnet, an armature in the magnetic field, a projecting arm on the armature, a link connected near one end to the armature through a lost-motion connection and at the other end pivotally connected to the plate, and a spring to retain the arm at one end of the lost-motion connection.

29. In a signal apparatus, a casing having side walls provided with an opening, a plate hingedly mounted adjacent one of the edges of the opening, and means to swing the plate into extended signaling position, said means comprising an electro-magnet, an armature in the magnetic field, a projecting arm on the armature, a link connected near one end to the armature through a lost-motion connection and at the other end pivotally connected to the plate, and a spring to retain the arm at one end of the lost-motion connection, the energizing of the magnet moving the arm and the link to the other end of the lost-motion connection.

30. In a signal apparatus, a casing having side walls provided with an opening, a plate hingedly mounted adjacent one of the edges of the opening, and means to swing the plate into an extended signaling position, said means comprising an electro-magnet, an armature in the magnetic field, a projecting arm on the armature, a link connected near one end to the armature through a lost-motion connection and at the other end pivotally connected to the plate, and a spring to retain the arm at one end of the lost-motion connection, the interrelations of the parts being such that the energizing of the magnet moves the arm and the link to the other end of the lost-motion connection and brings an intermediate portion of the link against the hinge which mounts one of the plates adjacent an edge of the opening.

31. In a signal apparatus, a casing having side walls provided with an opening, a pair of plates hingedly associated with the casing, one plate being mounted adjacent one of the edges of the opening, and means to swing the plates into either an extended signaling position or into a closed position, said means comprising an electro-magnet, an armature in the magnetic field, a projecting arm on the armature, a link connected near one end to the armature through a lost-motion connection and at the other end pivotally connected to one of the plates, a catch mechanism having cooperative parts on the arm and on one of the plates respectively, and a spring to retain the arm at one end of the lost-motion connection and the catch mechanism in locked position, the interrelations of the parts being such that the energizing of the magnet moves the arm and the link to the other end of the lost-motion connection.

32. In a signal apparatus, a casing having side walls provided with an opening, a pair of plates hingedly associated with the casing, one plate being mounted adjacent one of the edges of the opening, and means to swing the plates into either an extended signaling position or into a closed position, said means comprising an electro-magnet, an armature in the magnetic field, a projecting arm on the armature, a link connected near one end to the armature through a lost-motion connection and at the other end pivotally connected to one of the plates, a catch mechanism having cooperative parts on the arm and on one of the plates respectively, and a spring to retain the arm at one end of the lost-motion connection and the catch mechanism in locked position, the interrelation of the parts being such that the energizing of the magnet moves the arm and the link to the other end of the lost-motion connection and brings an intermediate portion of the link against the hinge which mounts one of the plates adjacent an edge of the opening.

33. In a signal apparatus, a casing having side walls provided with an opening and having an end wall, a pair of plates hingedly associated with the casing, one plate being mounted adjacent an edge of the opening in the side wall, an electro-magnet carried on an end plate and located within the casing, an armature for the electro-magnet, interconnections between the armature and plates to swing them into an extended signaling position or into a closed position whereby they close the opening, an electric lamp supported from the casing and projecting outside of the opening in the casing into a position to illuminate the plates when in signaling position and to be obscured by the plates when in closed position, the plates when in closed position being at a dihedral angle to one another whereby they accommodate the projecting lamp.

34. In a signal apparatus, a casing having side walls provided with an opening and having an end wall, a pair of plates hingedly associated with the casing, one plate being mounted adjacent an edge of the opening in the side wall, an electro-magnet carried on an end plate and located within the casing, an armature for the electro-magnet, interconnections between the armature and plates to swing them into an extended signaling position or into a closed position whereby they close the opening, an electric lamp supported from the casing and projecting outside of the opening in the casing into a position to illuminate the plates when in signaling position and to be obscured by the plates when in closed position, the plates when in closed position being at a dihedral angle to one another whereby they accommodate the projecting lamp, and a spring-controlled mechanism adapted to lock the plates in closed position when the magnet is de-energized.

35. In a signal apparatus, a casing having side walls provided with an opening and having a top wall, a pair of plates hingedly associated with the casing, one plate being mounted adjacent an edge of the opening in the side wall, an electro-magnet suspended underneath the top wall and carried within the casing, an armature for the electro-magnet, interconnections between the armature and plates to swing them into an extended signaling position or into a closed position whereby they close the opening, an electric lamp underneath the electro-magnet and projecting out of the side of the opening in the casing into a position to illuminate the plates when in signaling position and to be obscured by the plates when in closed position, the plates when in closed position being at a dihedral angle to one another whereby they accommodate the projecting lamp, and a spring-controlled mechanism adapted to lock the plates in closed position when the magnet is de-energized.

36. In a signal apparatus, a casing having side walls provided with an opening and having a top wall, a pair of plates hingedly associated with the casing, one plate being mounted adjacent an edge of the opening in the side wall, an electro-magnet suspended underneath the top wall and carried within the casing, an armature for the electro-magnet, interconnections between the armature and plates to swing them into an extended signaling position or into a closed position whereby they close the opening, an electric lamp underneath the electro-magnet in a position to illuminate the plates when in signaling position and to be obscured by the plates when in closed position, and a spring-controlled mechanism adapted to lock the plates in closed position when the magnet is de-energized.

TIMOTHY B. POWERS.